United States Patent [19]

Grimm et al.

[11] Patent Number: 4,866,244
[45] Date of Patent: Sep. 12, 1989

[54] ARRANGEMENT FOR MACHINING A WORKPIECE BY MEANS OF A LASER BEAM

[75] Inventors: Wolfgang Grimm, Heidenheim; Heinz-Wilhelm Paysan, Aalen-Waldhausen; Hermann Schürle, Aalen, all of Fed. Rep. of Germany

[73] Assignee: Carl-Zeiss-Stiftung, Heidenheim/Brenz, Fed. Rep. of Germany

[21] Appl. No.: 237,550

[22] Filed: Aug. 29, 1988

[30] Foreign Application Priority Data

Aug. 27, 1987 [EP] European Pat. Off. ........ 87112434.3

[51] Int. Cl.⁴ .............................................. B23K 26/00
[52] U.S. Cl. ........................... 219/121.63; 219/121.67; 219/121.7
[58] Field of Search ...................... 219/121.63, 121.64, 219/121.67, 121.72, 121.68, 121.69, 121.70, 121.71

[56] References Cited

U.S. PATENT DOCUMENTS

| | | | |
|---|---|---|---|
| 3,656,230 | 10/1972 | Friedrich | 219/121.84 X |
| 3,749,878 | 7/1973 | Sullivan et al. | 219/121.84 X |
| 3,982,206 | 9/1976 | Poulsen | 350/160 R X |
| 4,149,062 | 4/1979 | Limmer et al. | 219/121.84 X |
| 4,162,390 | 7/1979 | Kelly | 219/121.84 X |
| 4,590,248 | 5/1986 | Moriya et al. | 526/228 |
| 4,653,495 | 3/1987 | Nanaumi | 128/303 |

*Primary Examiner*—C. L. Albritton
*Attorney, Agent, or Firm*—Walter Ottesen

[57] ABSTRACT

An arrangement for machining material by means of a laser beam includes a laser and an exit window mounted between the laser and the workpiece to be machined. The exit window is made of a highly-interlaced plastic to substantially prevent a contamination of the window by means of material splatterings during the machining operation. The highly-interlaced plastic has a high elasticity in microscopic regions. Such a window made, for example, from allyldiglocylcarbonate has a long service life which extends to several days in automatically operating equipment for spot welding with a laser beam.

7 Claims, 1 Drawing Sheet

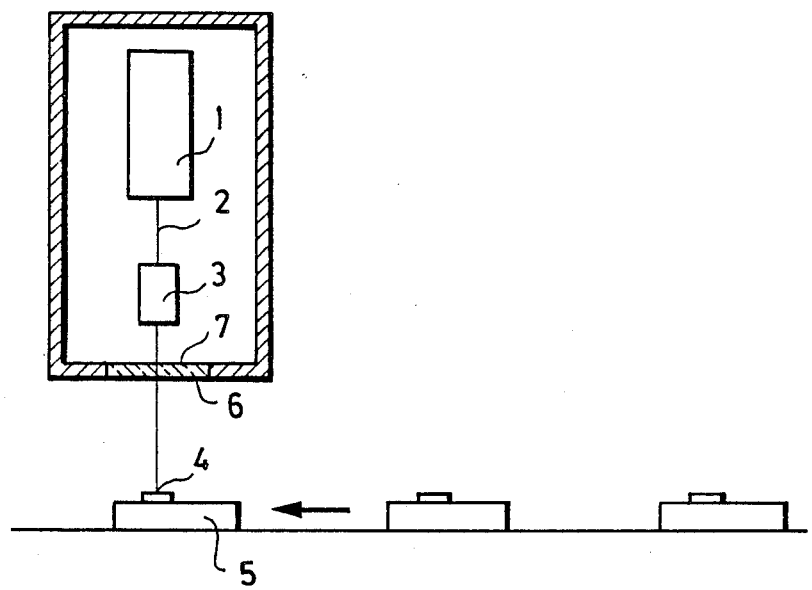

ARRANGEMENT FOR MACHINING A WORKPIECE BY MEANS OF A LASER BEAM

FIELD OF THE INVENTION

The invention relates to an arrangement for machining material by means of a laser beam. The arrangement includes a laser and an exit window arranged between the laser and the workpiece to be machined.

BACKGROUND OF THE INVENTION

Arrangements are known wherein a beam generated, for example, by a Nd/YAG laser is utilized in order to machine a workpiece. This machining can be carried out as boring, cutting or welding of the workpiece depending upon the energy density of the laser beam at the point of incidence.

Splatterings of the particular material are produced during all of these machining processes and are hurled also in the direction of the laser source. Since these material splatterings can contaminate the sensitivity of the laser optics, an exit window arranged between the workpiece and the laser is customarily utilized. The exit window shields the laser against splatterings of the material.

Such an exit window is made of glass and can be provided with a layer which increases the transmission. Exit windows of this kind are relatively expensive since their surfaces must be mutually parallel to a high degree of precision in order to prevent disturbing optical influences.

It has been shown that metal splatterings burn into an exit window made of glass, for example, when welding metal. In this way, conchoidal fractures develop in the glass. This dirtying of the exit window effects changes and distortions of the laser beam passing through the window since the cross section of the beam is small compared to the magnitude of the resultant contaminations.

In arrangements for welding metals and especially for spot welding by means of a laser beam, the contaminations of the exit windows lead to gradual reductions in quality as a consequence of the laser beam being optically influenced. With automatically driven equipment, these quality reductions can only be recognized during a later examination of the workpiece.

Previously, it was the practice to limit the service life of the exit windows in order to limit the number of such defective weldings. This leads to the situation that the exit windows have to be exchanged after only a few hours of operation.

The frequent interruptions in production caused by this exchange of exit windows leads to an increase in the cost of production which is further increased by the cost of the substitute windows.

SUMMARY OF THE INVENTION

It is an object of the invention to provide an arrangement for machining material by means of a laser beam wherein the exit window attains a very substantially increased service life so that a significant reduction of the production costs is made possible.

The arrangement according to the invention performs machining operations on a workpiece by means of a laser beam during which splatterings of the workpiece material are produced. The arrangement includes: a laser for generating the laser beam; optical means for acting on the laser beam so as to cause the latter to impinge upon the workpiece with the energy density and diameter required to perform the machining operation; an exit window through which the laser beam is passed from the optical means to the workpiece; and, the exit window being made of a highly-interlaced plastic so as to cause the splatterings of material to rebound elastically therefrom thereby increasing the service life of the exit window.

An exit window of this kind surprisingly provides a service life of up to several days when utilized in an arrangement for spot welding by means of a laser beam. In contrast, the service life of exit windows made of glass is only two to four hours.

It is advantageous to make the exit window out of a thermosetting plastic. A suitable plastic should have a modulus of elasticity of greater than 1.5 kN/mm$^2$ pursuant to DIN 53457 and an indentation hardness value of greater than 80 N/mm$^2$ pursuant to DIN 53456.

The plastic allyldiglocylcarbonate (ADC) fulfills the above requirements and is also commercially available in the Federal Republic of Germany under the designation CR 39. This plastic is highly interlaced and has thermosetting plastic characteristics. It can be poured and provides such a hardness in the completely polymerized condition that it can be optically machined. This optical machinability is very important since the exit window must be a very precisely machined plate having mutually parallel surfaces.

The plastic utilized comprises macromolecules whose structure assures a high elasticity in microscopically small regions. In an exit window of the arrangement according to the invention, this microelasticity provides the condition that the material splatterings generated during the machining of the material and impinging on the window rebound from the latter without effecting a permanent change in the material of the window. Only after a very long service life which can be up to ten days does the continuous bombardment of the window effect pemanent and disturbing contaminations which make an exchange of the exit window necessary.

The microelasticity of the material is a very important factor in the exit window of the arrangement according to the invention. Up to the present time, there is no dimensioning number for this microelasticity; however, and according to recent investigations, the elasticity of microscopically small regions can be determined by means of the so-called ultrasonic microscope. It is also possible with the aid of such a microscope to select materials which have a microelastically which is adequate for an exit window in an arrangement for machining materials with the aid of a laser.

According to a feature of the invention, the exit window is provided with a layer for increasing the transmission and this layer is generated on the surface of the window facing the laser by means of vapor deposition.

BRIEF DESCRIPTION OF THE DRAWING

The single figure of the drawing is a schematic representation of an arrangement according to the invention for spot welding by means of a laser beam. The arrangement is equipped with an exit window through which the laser beam is passed to the workpiece on which the machining operation is to be performed.

DESCRIPTION OF THE PREFERRED EMBODIMENTS OF THE INVENTION

Reference numeral 1 designates a laser such as a Nd/YAG laser. The high energy beam 2 emitted from the laser is so influenced by means of the optics 3 that it has the diameter required for spot welding with the required energy density at the location of impingement 4 on the workpiece 5.

An exit window 6 is exchangeably mounted between the workpiece 5 and the optics 3. This window is made of allyldiglocylcarbonate and is provided with a layer 7 on the side thereof facing toward the laser 1 to increase transmission.

During machining, the workpieces 5 are sequentially moved to the impingement location 4. The laser 1 is switched on and effects a spot welding as soon as the workpiece has reached the welding position. The material splatterings arising at the welding location rebound elastically at the exit window 6 so that the latter does not have to be exchanged during a very long service life which can be ten days in an automatic operation of the equipment with the manufacturing quality remaining the same.

It is understood that the foregoing description is that of the preferred embodiments of the invention and that various changes and modifications may be made thereto without departing from the spirit and scope of the invention as defined in the appended claims.

What is claimed is:

1. An arrangement for performing a machining operation on a workpiece by means of a laser beam during which splatterings of the workpiece material are produced, the arrangement comprising:
   a laser for generating the laser beam;
   optical means for acting on the laser beam so as to cause the latter to impinge upon the workpiece with the energy density and diameter required to perform the machining operation;
   an exit window through which the laser beam is passed from said optical means to the workpiece; and,
   said exit window being made of a highly-interlaced and optically machinable plastic having a predetermined module of elasticity and an indentation hardness adequate to cause said splatterings of material to rebound elastically therefrom thereby increasing the service life of said exit window.

2. The arrangement of claim 1, said plastic being a thermosetting plastic.

3. An arrangement for performing a machining operation on a workpiece by means of a laser beam during which splatterings of the workpiece material are produced, the arrangement comprising:
   a laser for generating the laser beam;
   optical means for acting on the laser beam so as to cause the latter to impinge upon the workpiece with the energy density and diameter required to perform the machining operation;
   an exit window through which the laser beam is passed from said optical means to the workpiece;
   said exit window being made of a highly-interlaced plastic so as to cause said splatterings of material to rebound elastically therefrom thereby increasing the service life of said exit window; and,
   said plastic having a module of elasticity greater than 1.5 kN/mm$^2$ pursuant to DIN 53457.

4. An arrangement for performing a machining operation on a workpiece by means of a laser beam during which splatterings of the workpiece material are produced, the arrangement comprising:
   a laser for generating the laser beam;
   optical means for acting on the laser beam so as to cause the latter to impinge upon the workpiece with the energy density and diameter required to perform the machining operation;
   an exit window through which the laser beam is passed from said optical means to the workpiece;
   said exit window being made of a highly-interlaced plastic so as to cause said splatterings of material to rebound elastically therefrom thereby increasing the service life of said exit window; and,
   said plastic having an indentation hardness of greater than 80 N/mm$^2$ pursuant to DIN 53456.

5. An arrangement for performing a machining operation on a workpiece by means of a laser beam during which splatterings of the workpiece material are produced, the arrangement comprising:
   a laser for generating the laser beam;
   optical means for acting on the laser beam so as to cause the latter to impinge upon the workpiece with the energy density and diameter required to perform the machining operation;
   an exit window through which the laser beam is passed from said optical means to the workpiece;
   said exit window being made of a higly-interlaced plastic so as to cause said splatterings of material to rebound elastically therefrom thereby increasing the service life of said exit window; and,
   said exit window being made of allyldiglocylcarbonate (ADC).

6. An arrangement for performing a machining operation on a workpiece by means of a laser beam during which splatterings of the workpiece material are produced, the arrangement comprising:
   a laser for generating the laser beam;
   optical means for acting on the laser beam so as to cause the latter to impinge upon the workpiece with the energy density and diameter required to perform the machining operation;
   an exit window through which the laser beam is passed from said optical means to the workpiece;
   said exit window being made of a higly-interlaced plastic so as to cause said splatterings of material to rebound elastically therefrom thereby increasing the service life of said exit window; and,
   said exit window having a surface facing toward said laser and having a layer formed on said surface for increasing the transmission of said beam through said window.

7. The arrangement of claim 1, wherein said machining operation is the welding of workpieces.

* * * * *

UNITED STATES PATENT AND TRADEMARK OFFICE
CERTIFICATE OF CORRECTION

PATENT NO. : 4,866,244

DATED : September 12, 1989

INVENTOR(S) : Wolfgang Grimm, Heinz-Wilhelm Paysan and Hermann Schürle

It is certified that error appears in the above-identified patent and that said Letters Patent is hereby corrected as shown below:

On the title page, under "U.S. PATENT DOCUMENTS": delete "3,656,230 10/1972 Friedrich...." and substitute -- 3,696,230 10/1972 Friedrich.... -- therefor.

In column 2, line 42: delete "pemanent" and substitute -- permanent -- therefor.

In column 2, line 53: delete "microelastically" and substitute -- microelasticity -- therefor.

In column 4, line 52: delete "higly-interlaced" and substitute -- highly-interlaced -- therefor.

Signed and Sealed this

Second Day of October, 1990

Attest:

HARRY F. MANBECK, JR.

*Attesting Officer*          *Commissioner of Patents and Trademarks*